(12) United States Patent
Kodo et al.

(10) Patent No.: US 9,329,385 B2
(45) Date of Patent: May 3, 2016

(54) EXPOSURE DEVICE AND IMAGE FORMING APPARATUS WITH EXPOSURE DEVICE

(71) Applicants: KABUSHIKI KAISHA TOSHIBA, Tokyo (JP); TOSHIBA TEC KABUSHIKI KAISHA, Tokyo (JP)

(72) Inventors: Masahiro Kodo, Izunokuni Shizuoka (JP); Takahiro Kojima, Mishima Shizuoka (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/644,123

(22) Filed: Mar. 10, 2015

(65) Prior Publication Data

US 2015/0309438 A1 Oct. 29, 2015

(30) Foreign Application Priority Data

Apr. 24, 2014 (JP) .................. 2014-090330

(51) Int. Cl.
*G02B 7/198* (2006.01)
*G02B 26/08* (2006.01)
*G02B 26/12* (2006.01)
*B41J 2/435* (2006.01)
*G03G 15/043* (2006.01)
*G03G 15/04* (2006.01)
*G02B 7/00* (2006.01)

(52) U.S. Cl.
CPC .............. *G02B 26/125* (2013.01); *B41J 2/435* (2013.01); *G02B 7/004* (2013.01); *G02B 7/198* (2013.01); *G02B 26/0816* (2013.01); *G03G 15/0435* (2013.01); *G03G 15/04072* (2013.01)

(58) Field of Classification Search
CPC ....... B41J 2/435; G02B 7/004; G02B 7/1824; G02B 7/1827; G02B 7/198; G02B 26/0816; G02B 26/125
See application file for complete search history.

(56) References Cited

U.S. PATENT DOCUMENTS

| 5,963,240 | A | * | 10/1999 | Shinohara et al. | ............ | 347/116 |
| 2006/0126148 | A1 | * | 6/2006 | Ushio | ............ | 359/212 |
| 2012/0182368 | A1 | | 7/2012 | Kojima | | |

FOREIGN PATENT DOCUMENTS

JP 3087457 B 9/2000

* cited by examiner

*Primary Examiner* — Kristal Feggins
*Assistant Examiner* — Kendrick Liu
(74) *Attorney, Agent, or Firm* — Patterson & Sheridan, LLP

(57) ABSTRACT

According to an embodiment, an exposure device has first and second eccentric cams. The first eccentric cam has an eccentric shape that supports a first mirror support point located near the center on one end side in a longitudinal direction of a mirror and varies a distance between a first rotary shaft and the first mirror support point in correspondence to rotation around the first rotary shaft. The second eccentric cam has an eccentric shape that supports a second mirror support point of two support points located on the other end side in the longitudinal direction of the mirror and varies a distance between a rotary shaft and the second mirror support point in correspondence to rotation around the rotary shaft.

8 Claims, 8 Drawing Sheets

EXPOSURE DEVICE AND IMAGE FORMING APPARATUS WITH EXPOSURE DEVICE

CROSS-REFERENCE TO RELATED APPLICATION

This application is based upon and claims the benefit of priority from the prior Japanese Patent Application No. 2014-090330, filed on Apr. 24, 2014, the entire contents of which are incorporated herein by reference.

FIELD

An embodiment to be described below relates generally to an exposure device and an image forming apparatus using an exposure device.

BACKGROUND

An exposure device mounted in an image forming apparatus typically includes a light source emitting a laser beam, a collimator lens converging the laser beam emitted from the light source, an imaging lens, a polygon mirror (rotating polygon mirror) deflecting the converged light beam, and a reflecting mirror reflecting the laser beam, deflected by the polygon mirror, onto a photoreceptor drum as an object to be exposed. The reflecting mirror is located on the most downstream side of the travelling direction of the laser beam in the exposure device. The angle of a reflection surface of the reflecting mirror can be adjusted by a position adjustment unit of a mirror support portion. For example, the reflecting mirror has two mirror support points at one end in a longitudinal direction of the reflection surface (or a surface opposite to the reflecting surface) and one mirror support point at the other end. The attitude of the reflecting mirror is determined by the relative position among the three mirror support points. The reflecting mirror is fixed by receiving a load in an opposite direction as a mirror support direction, using a leaf spring and so on. One of the two mirror support points is positioned by, for example, the projecting amount of the tip of an adjustment screw. The angle of the reflecting mirror can be adjusted by positioning the mirror support point.

However, when the angle of the reflecting mirror is adjusted in the prior art, the adjustment screw is required to be inserted from a direction at right angles to a mirror surface. Accordingly, in conventional exposure devices, since a screw hole is required to be formed obliquely with respect to a housing, a mold structure is complicated, or an extra component corresponding to the adjusted angle is required to be provided. Thus, when the exposure apparatus has a plurality of reflecting mirrors, and when the reflecting mirrors are adjusted to different angles, there is a problem that a screw hole is required to be formed in a housing in accordance with each angle, or an extra component corresponding to the adjusted angle is needed.

DETAILED DESCRIPTION

Figure 1:
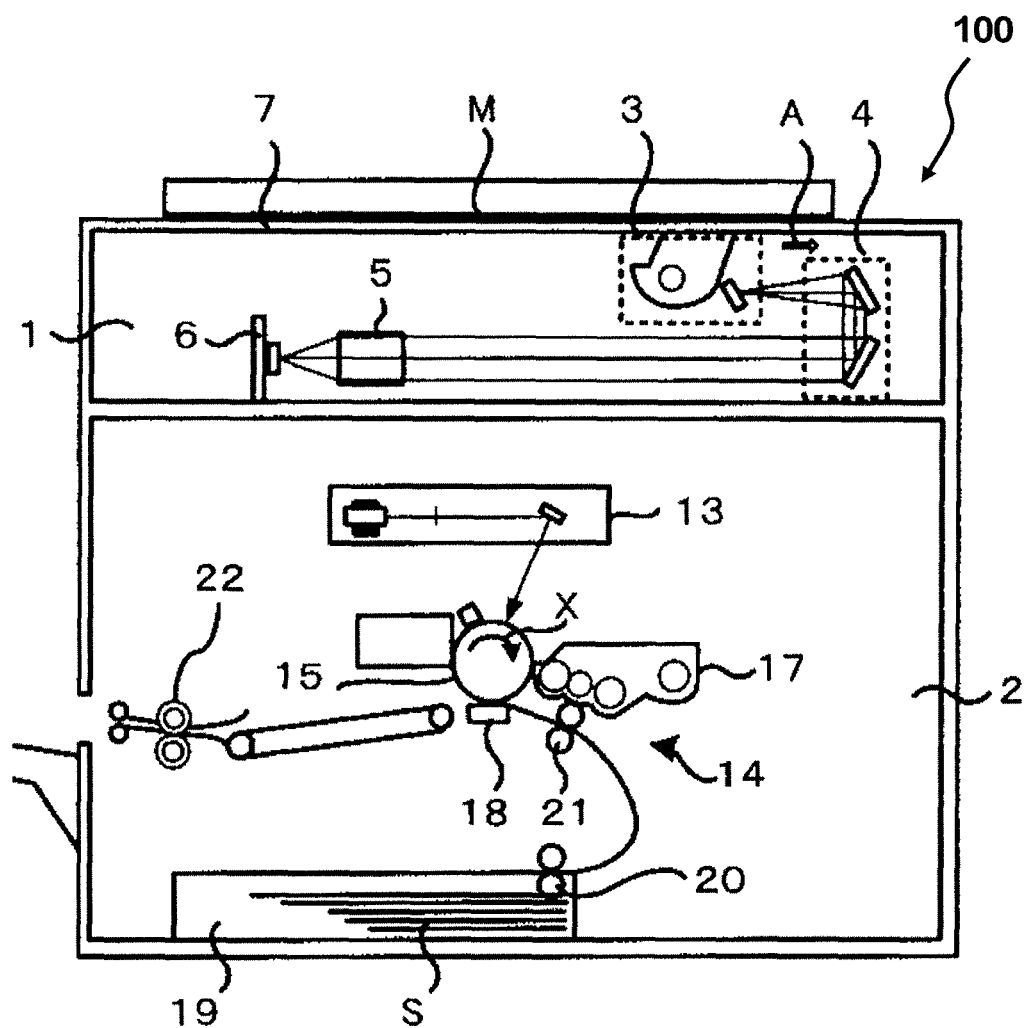
FIG. 1 is a cross-sectional view showing a main part of an image forming apparatus mounted with an exposure device according to a first embodiment.

An exposure apparatus according to an embodiment has a mirror, an elastic member, a first eccentric cam, and a second eccentric cam. The mirror reflects light, emitted from a light source in a housing, toward an object to be exposed. The elastic members are arranged at both ends in a longitudinal direction of the mirror, are abutted against a reflection surface of the mirror or a surface facing the reflection surface, and press a surface of the mirror. The first eccentric cam is located opposite to the elastic member across the mirror on one end side in the longitudinal direction of the mirror so as to be rotatable around a first rotary shaft. The first eccentric cam has an eccentric shape including a first outer peripheral portion, which is abutted against a first mirror support point, located near the center on one end side in the longitudinal direction of the mirror, to support the first mirror support point. Further, the first eccentric cam has the eccentric shape in which a distance between the first rotary shaft and the first mirror support point varies corresponding to rotation around the first rotary shaft. The second eccentric cam is located opposite to the elastic member across the mirror so as to be rotatable around a second rotary shaft. The second eccentric cam has an eccentric shape including a second outer peripheral portion, which is abutted against a second mirror support point of two mirror support points located on the other end side in the longitudinal direction of the mirror to support the second mirror support point. Further, the second eccentric cam has the eccentric shape in which a distance between the second rotary shaft and the second mirror support point varies corresponding to rotation around the second rotary shaft.

Hereinafter, another embodiment will be described with reference to the drawings. In the drawings, the same or similar components are denoted by the same reference numerals.

An image forming apparatus 100 mounted with an exposure device 13 according to a first embodiment will be described with reference to FIG. 1. FIG. 1 is a cross-sectional view showing a main part of the image forming apparatus 100. As shown in FIG. 1, the image forming apparatus 100 has a scanner unit 1 as image reading means and a printer unit 2 as image forming means. The scanner unit 1 has a first carriage 3, a second carriage 4, an imaging lens 5, and a photoelectric conversion element 6. The first carriage 3 moves in an arrow A direction. The scanner unit 1 further has an image processing unit (not shown). The scanner unit 1 sequentially reads an image of a manuscript M placed on a manuscript stage 7 line by line and then outputs a signal of the read image to the image processing unit. The image processing unit converts the input image signal into, for example, an 8-bit digital image signal indicating image shading.

The printer unit 2 has an exposure device 13 and an image forming unit 14. The image forming unit 14 forms an image on a sheet S as a recording medium, using, for example, an electrophotographic system. The image forming apparatus 100 has a sheet storage unit 19 storing the sheets S. The image forming apparatus 100 has a transport unit including a pickup roller 20 and a feed roller 21. The pickup roller 20 picks up the sheets S from the sheet storage unit 19 one by one. The feed roller 21 feeds the picked up sheet S to the image forming unit 14.

The printer unit 2 has an image processing unit (not shown) such as CPU, ROM, and RAM. The image processing unit of the printer unit 2 processes the image signal, which is output from the scanner unit 1 when the scanner unit 1 has read the manuscript M. The exposure device 13 includes a laser diode as a light source 130, as described later. The laser diode of the exposure device 13 applies a laser beam (light) corresponding to the processed image signal to a photoreceptor drum 15 and thereby exposes the photoreceptor drum 15. The exposure device 13 forms an electrostatic latent image on the exposed photoreceptor drum 15.

The image forming unit 14 has the photoreceptor drum 15, a developer 17, and a transfer charger 18. The photoreceptor drum 15 rotates around a rotary shaft. The photoreceptor drum 15 is an image carrier on a surface of which the electrostatic latent image corresponding to the image signal is formed by the laser beam applied from the exposure device 13. The developer 17 develops the electrostatic latent image on the photoreceptor drum 15 with the use of toner (developer) and thereby forms a toner image on the photoreceptor drum 15. The transfer charger 18 transfers the toner image on the photoreceptor drum 15 onto the sheet S, supplied by the transport unit at proper timing, at a point of a transfer position.

The printer unit 2 further has a fixing device 22 and a paper discharge unit 23. The fixing device 22 heats a toner image formed by the image forming unit 14 while pressurizing the toner image on the sheet S and thus fixes the toner image onto the sheet S. The paper discharge unit 23 is provided on the more downstream side in a sheet transport direction than the fixing device 22. The paper discharge unit 23 receives the sheet S fixed with the toner image and thereafter discharged outside the image forming apparatus 100. The image forming apparatus 100 performs continuous image formation by repeating the above process.

Figure 2:
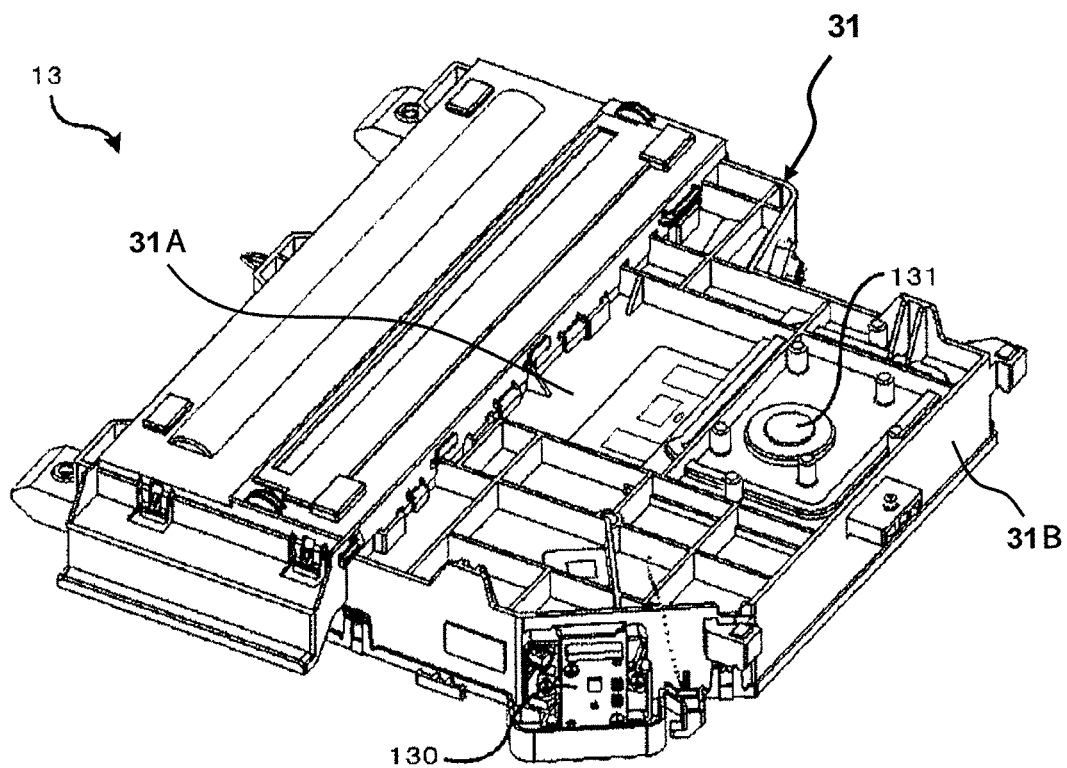
FIG. 2 is a perspective view showing the exposure device according to the first embodiment.
Figure 3:
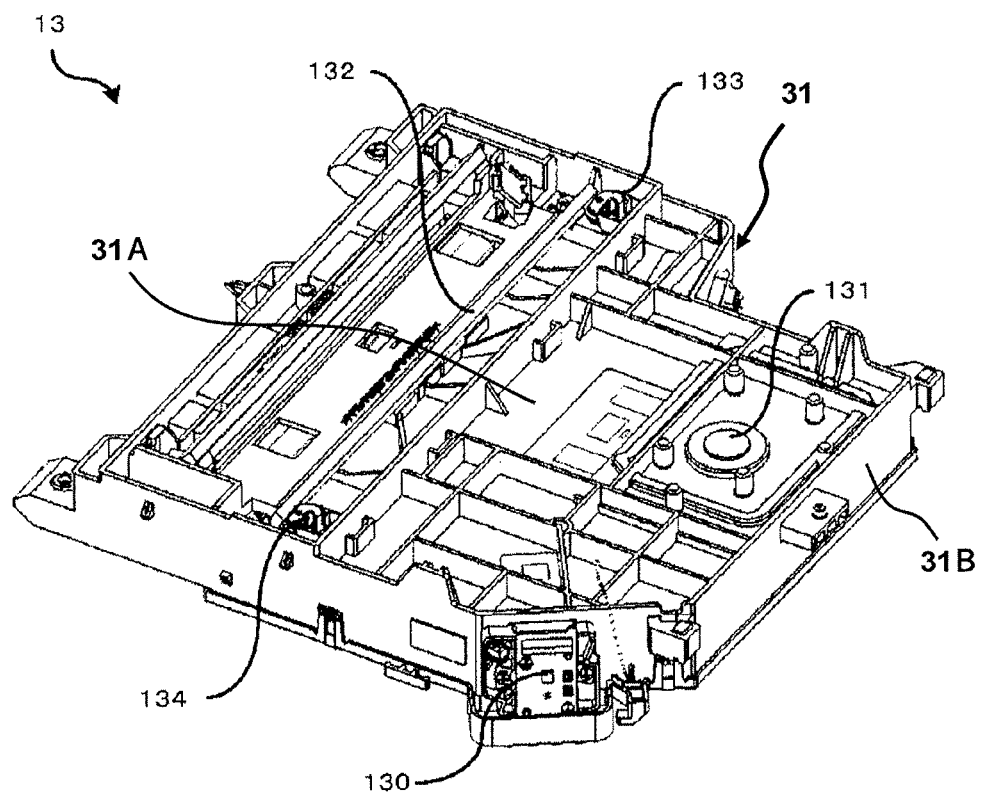
FIG. 3 is a perspective view showing a state in which a cover is removed from the exposure device according to the first embodiment.

Hereinafter, the exposure device 13 will be described with reference to FIGS. 2 and 3. FIG. 2 is a perspective view showing the exposure device 13 according to the first embodiment. FIG. 3 is a perspective view showing a state in which a cover is removed from the exposure device 13 shown in FIG. 2. The exposure device 13 has an optical system such as a light source 130, a polygon mirror 131, an imaging lens (not shown), and a mirror 132 (hereinafter referred to as a reflecting mirror). The exposure device 13 further has a housing 31. As shown in FIGS. 2 and 3, the housing 31 includes a bottom portion 31A having a substantially rectangular shape and a side wall portion 31B extending vertically upward from the bottom portion 31A. The bottom portion 31A and the side wall portion 31B are integrally formed, for example, of synthetic resin or from a metal plate to obtain a predetermined rigidity. The housing 31 stores the optical system therein.

The light source 130 includes a laser diode (not shown) emitting a laser beam. The exposure device 13 further has a collimator lens (not shown), a reflection mirror (not shown), and so on included in an optical system. The collimator lens is a finite focal lens. The collimator lens converges the laser beam emitted from the light source 130. The reflection mirror folds the laser beam passing through the collimator lens and guides the laser beam to the polygon mirror 131. The polygon mirror 131 is rotated by a polygon motor (not shown). The polygon mirror 131 rotates to serve as a deflecting portion which deflects a laser beam (image light) in a main scanning direction. The imaging lens imparts predetermined optical characteristics to the laser beam deflected in a predetermined direction by each reflection surface of the polygon mirror 131. The laser beam which has passed through the imaging lens is applied on a reflection surface of the reflecting mirror 132. The reflecting mirror 132 reflects the laser beam applied thereon toward the photoreceptor drum 15 as an object to be exposed. In this embodiment, the reflecting mirror 132 is supported at a total of three points including one point (a first mirror support point P1 to be described later) near the center in a lateral direction on one end side of the reflection surface and two points (a second mirror support point P2 and a third mirror support point P3 to be described later) on the other end side of the reflection surface. When those three points on the same plane are connected, an isosceles triangle is formed. The exposure device 13 further has a first mirror angle adjustment unit 133 and a second mirror angle adjustment unit 134. The first mirror angle adjustment unit 133 is disposed on one end side in the longitudinal direction of the reflecting mirror 132. The second mirror angle adjustment unit 134 is disposed on the other end side in the longitudinal direction of the reflecting mirror 132. The first mirror angle adjustment unit 133 and the second mirror angle adjustment unit 134 adjust the mirror angle of the reflecting mirror 132. In other words, the angle of the reflecting mirror 132 is adjusted by the first mirror angle adjustment unit 133 disposed on one end side in the longitudinal direction and the second mirror angle adjustment unit 134 disposed on the other end side. In the adjustment of the angle of the reflecting mirror 132, two kinds of angles of an angle in a direction of the reflection surface and an angle (inclination) in the longitudinal direction of the mirror are adjusted. More specifically, the first mirror angle adjustment unit 133 moves one end side supported at the above-described point of the reflecting mirror 132. The first mirror angle adjustment unit 133 moves the one end side of the reflecting mirror 132 and thereby adjusts the inclination in the longitudinal direction of the reflecting mirror 132. Meanwhile, the second mirror angle adjustment unit 134 moves the other end side supported at the above-described two points of the reflecting mirror 132. The second mirror angle adjustment unit 134 moves the other end side of the reflecting mirror 132 and thereby adjusts the mirror angle (reflection angle).

Figure 4:
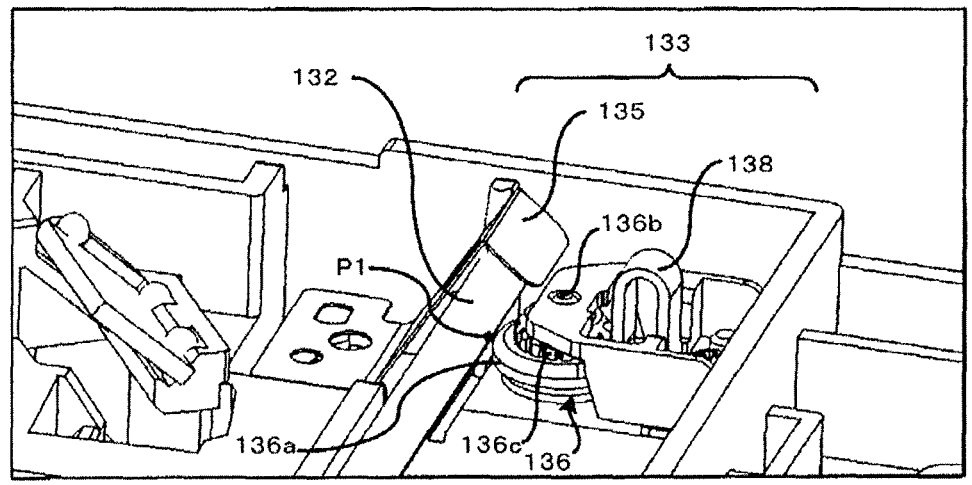
FIG. 4 is an enlarged view showing a first mirror angle adjustment unit of the exposure device according to the first embodiment.

Hereinafter, the first mirror angle adjustment unit 133 will be described with reference to FIG. 4. FIG. 4 is an enlarged view showing the first mirror angle adjustment unit 133 shown in FIG. 3. The first mirror angle adjustment unit 133 has a leaf spring 135, a first eccentric cam 136, and a stopper 138.

The first eccentric cam 136 is located opposite to the leaf spring 135, which is an elastic member, across the reflecting mirror 132. The first eccentric cam 136 is located opposite to the leaf spring 135 to be rotatable around a first rotary shaft 136b. The first rotary shaft 136b is fixed vertically to a surface of the bottom portion 31A of the housing 31. In the following description, the surface of the bottom portion 31A is also referred to as a bottom surface 31A. The first eccentric cam 136 is a member having an eccentric shape including a first outer peripheral portion 136a. More specifically, the first outer peripheral portion 136a is abutted against the first mirror support point P1 located near the center on one end side in the longitudinal direction of the reflecting mirror 132 to support the first mirror support point P1. The first eccentric cam 136 has the above-described eccentric shape in which the first outer peripheral portion 136a is abutted against the first mirror support point P1 to rotate, and, thus, to vary a distance between the first rotary shaft 136b and the first mirror support point P1. The shape and size of the first eccentric cam 136 are determined so that the distance between the first rotary shaft 136b and the first mirror support point P1 varies at a constant ratio in correspondence to the rotation angle of the first eccentric cam 136. Since the variation ratio is fixed, a worker for adjustment can easily perform fine adjustment of the mirror angle relative to a reference position by operating the first mirror angle adjustment unit 133.

The first eccentric cam 136 further has a first adjustment gear 136c. The first adjustment gear 136c is provided around the first rotary shaft. The first adjustment gear 136c switches the distance between the first rotary shaft 136b and the first mirror support point P1 in a stepwise manner. The second eccentric cam 137 adjusts the mirror angle in a stepwise manner by mating a second adjustment gear 137c with a claw of the stopper 138. The first adjustment gear 136c has on its outer periphery recesses formed at predetermined intervals. It is preferable that the recesses have constant sizes. The smaller the size of the recess is, the finer the adjustment of the mirror angle becomes.

The stopper 138 has the claw formed to mate with the first adjustment gear 136c. The stopper 138 is a member for fixing the first adjustment gear 136c at a desired position by mating the claw with the first adjustment gear 136c. The stopper 138 further has a drop prevention mechanism for the first eccentric cam 136. The drop prevention mechanism rotatably fixes the first eccentric cam 136 into the housing 31 to prevent the first eccentric cam 136 from dropping out from inside the housing 31 during the rotation of the first eccentric cam 136. The stopper 138 shown in FIG. 4 has a hole through which the first rotary shaft 136b of the first eccentric cam 136 passes and further has, as the drop prevention mechanism, a trapezoidal portion formed to cover an upper portion of the first eccentric cam 136. The second mirror angle adjustment unit 134 to be described later also has the stopper 138.

Figure 5:
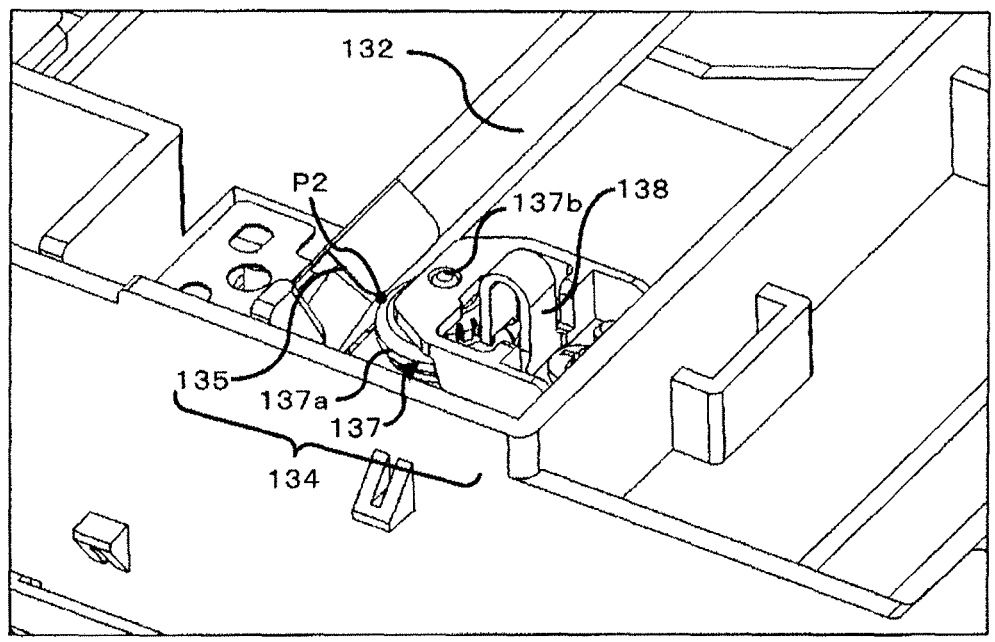
FIG. 5 is an enlarged view showing a second mirror angle adjustment unit of the exposure device according to the first embodiment.
Figure 6:
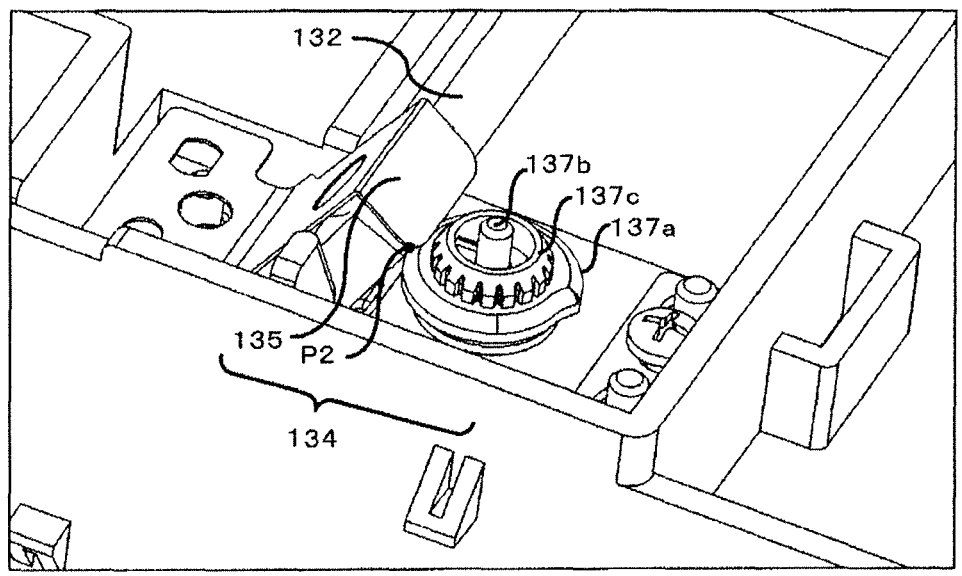
FIG. 6 is a view showing a state in which a stopper is removed from the second mirror angle adjustment unit of the exposure device according to the first embodiment.

Hereinafter, the second mirror angle adjustment unit 134 will be described with reference to FIGS. 5 and 6. FIG. 5 is an enlarged view of the second mirror angle adjustment unit 134 shown in FIG. 3. FIG. 6 is a view showing a state in which the stopper 138 is removed from the second mirror angle adjustment unit 134 shown in FIG. 5.

The second mirror angle adjustment unit 134 includes the leaf spring 135, the second eccentric cam 137, and the stopper 138 and has a structure similar to that of the first mirror angle adjustment unit 133.

The second eccentric cam 137 is located opposite to the leaf spring 135 across the reflecting mirror 132 on the other end side in the longitudinal direction of the mirror. The second eccentric cam 137 is located opposite to the leaf spring 135 to be rotatable around a second rotary shaft 137b. The second rotary shaft 137b is fixed vertically to the bottom portion 31A of the housing 31. The second eccentric cam 137 is a member having an eccentric shape including a second outer peripheral portion 137a. More specifically, the second outer peripheral portion 137a is abutted against the second mirror support point P2 of the two mirror support points located on the other end side in the longitudinal direction of the reflecting mirror 132 to support the second mirror support point P2. The second eccentric cam 137 has the above-described eccentric shape in which the second outer peripheral portion 137a is abutted against the second mirror support point P2 to rotate, and, thus, to vary a distance between the second rotary shaft 137b and the second mirror support point P2. The remaining one support point on the other end side (hereinafter referred to as the "third mirror support point P3") is not affected by the rotation of the second eccentric cam 137, and the position in the housing 31 is fixed. As with the first eccentric cam 136, the shape and size of the second eccentric cam 137 are determined so that the distance between the second rotary shaft 137b and the second mirror support point P2 varies at a constant ratio in correspondence to the rotation angle of the second eccentric cam 137. When the first eccentric cam 136 and the second eccentric cam 137 share members, it is advantageous in terms of reducing manufacturing cost.

In this embodiment, although the shapes and sizes of the first eccentric cam 136 and the second eccentric cam 137 are the same, they may be different from each other. The projecting amount of the first eccentric cam 136 or the second eccentric cam 137 toward the mirror reflection surface, that is, the distance between the first rotary shaft 136b or the second rotary shaft 137b and the mirror support point P1 or P2 can be arbitrarily changed depending on the shape and size of the cams. Accordingly, an adjustment sensitivity can be freely set compared with the prior art. For example, on each top surface of the first eccentric cam 136 and the second eccentric cam 137, reference points corresponding respectively to a plurality of mirror adjustment angles are marked. A worker for adjustment rotates the first eccentric cam 136 and the second eccentric cam 137 according to each mark and thereby can adjust the mirror angles as desired.

Figure 7:
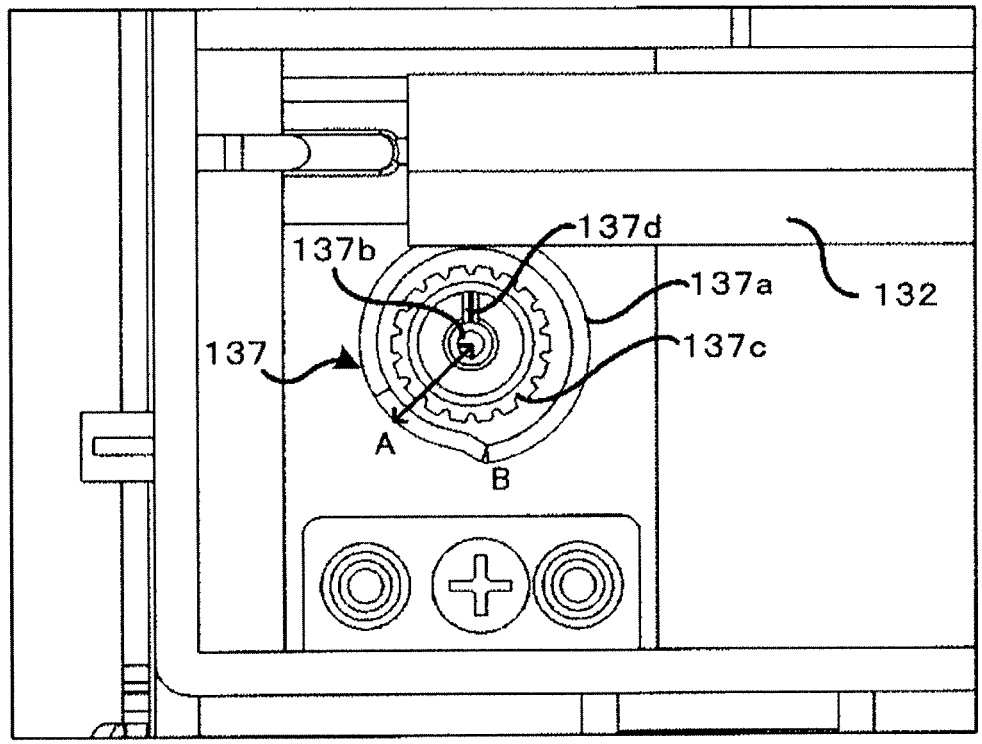
FIG. 7 is a top view showing the second mirror angle adjustment unit of the exposure device according to the first embodiment.

The second mirror angle adjustment unit 134 will be further described with reference to FIG. 7. FIG. 7 is a top view of the second mirror angle adjustment unit 134 shown in FIG. 6. In FIG. 7, the second eccentric cam 137 has an adjustment mark 137d for adjustment formed on an upper surface of the second eccentric cam 137. The adjustment mark 137d is a standard in the angle adjustment. For example, when a worker for adjustment manually rotates the second eccentric cam 137 counterclockwise from the position of the adjustment mark 137d, a distance between the second rotary shaft 137b and the second outer peripheral portion 137a of the second eccentric cam 137 gradually decreases, and the distance is shortest at a point A. In this case, in the reflecting mirror 132, a spatial position of the second support point P2 is gradually moved toward the cam by the elastic force of the leaf spring 135.

On the other hand, when the worker for adjustment rotates the second eccentric cam 137 in the clockwise direction, the distance between the second rotary shaft 137b and the second outer peripheral portion 137a of the second eccentric cam 137 gradually increases, the distance is longest at a point B. In this case, the spatial position of the second support point P2 is moved toward the leaf spring 135 by the pressing force of the second eccentric cam 137.

The second eccentric cam 137 further has the second adjustment gear 137c. The second adjustment gear 137c is provided around the second rotary shaft. The second adjustment gear 137c switches the distance between the second rotary shaft 137b and the second mirror support point P2 in a stepwise manner. The second adjustment gear 137c has on its outer periphery recesses formed at predetermined intervals. It is preferable that the recesses have constant sizes. The stopper 138 has a claw formed to mate with the second adjustment gear 137c. The stopper 138 is a member for fixing the second adjustment gear 137c at a desired position by mating the claw with the second adjustment gear 137c. The stopper 138 further has a drop prevention mechanism for the second eccentric cam 137. The drop prevention mechanism rotatably fixes the second eccentric cam 137 into the housing 31 to prevent the second eccentric cam 137 from dropping out from inside the housing 31 during the rotation of the second eccentric cam 137. As with the stopper 138 of the first mirror angle adjustment unit 133, the stopper 138 of the second mirror angle adjustment unit 134 has a hole through which the second rotary shaft 137b of the second eccentric cam 137 passes and further has, as the drop prevention mechanism, a trapezoidal portion formed to cover an upper portion of the second eccentric cam 137. The second eccentric cam 137 adjusts the mirror angle in a stepwise manner by mating the second adjustment gear 137c with the claw of the stopper 138. The smaller the size of the recess is, the finer the adjustment of the mirror angle becomes. For example, when a worker for adjustment rotates the second eccentric cam 137 in the clockwise or counterclockwise direction, the mating between the second adjustment gear 137c and the claw of the stopper 138 is temporarily released, and the second adjustment gear 137c and the claw of the stopper 138 mate with each other again at another position. At this time, since minute vibration is transmitted from the eccentric cam side to the worker who adjusts the angle of the mirror, the worker can easily feel a change of a gear position.

Figure 8:
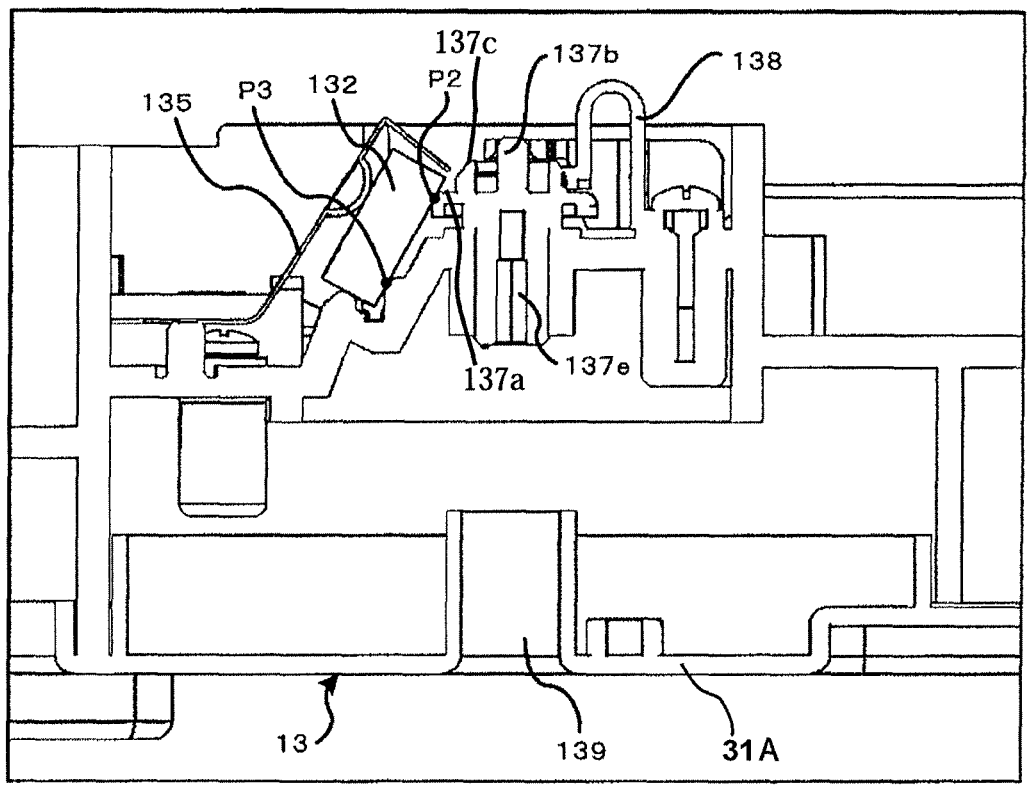
FIG. 8 is a cross-sectional view showing the second mirror angle adjustment unit of the exposure device according to the first embodiment.

The second mirror angle adjustment unit 134 will be further described with reference to FIG. 8. FIG. 8 is a cross-sectional view of the second mirror angle adjustment unit 134 shown in FIG. 6. In FIG. 8, the second eccentric cam 137 has an adjustment recess 137e for adjustment. The adjustment recess 137e is formed on a bottom surface of the second rotary shaft 137b. The second mirror angle adjustment unit 134 further has an eccentric cam adjustment hole 139. The eccentric cam adjustment hole 139 is formed by vertically penetrating through the bottom surface 31A of the housing 31 of the exposure device to suit a position of the adjustment recess 137e. For example, a worker for adjustment inserts a hexagonal wrench through the eccentric cam adjustment hole 139 to rotate the second adjustment gear 137c and thus can easily perform each adjustment from the back side (the bottom surface 31A side of the housing 31). The first mirror angle adjustment unit 133 similarly has this structure having the eccentric cam adjustment hole.

According to the exposure device 13 of this embodiment, the rotary shaft of the eccentric cam is fixed vertically to the bottom surface 31A of the housing 31. Accordingly, unlike the prior art, the rotary shaft of the eccentric cam is not required to be formed to suit the angle vertical to the reflection surface of the reflecting mirror. Namely, in the exposure device 13, a hole vertical to the rotary shaft of the eccentric cam may be formed in the bottom surface 31A on the housing 31 side. Accordingly, a mold for the housing 31 is not required to be formed to suit the angle of the mirror, and a mold structure can be simplified. Further, in the exposure device 13, no component for adjustment is required to be provided to suit the angle of the mirror.

Even when a plurality of mirrors to be adjusted at different angles is provided, the angles of the mirrors can be adjusted by using a common eccentric cam fixed to correspond to the positions of the mirrors. A hole used to fix a rotary shaft of the eccentric cam may be provided near the reflecting mirrors. Accordingly, in this case, the degree of freedom in arrangement of members for adjustment is high compared with conventional apparatuses using adjustment screws.

The exposure device 13 of this embodiment has a structure in which the eccentric cam can be rotated from the bottom surface 31A side of the housing 31 by using an adjustment tool corresponding to a shape of a recess for adjustment. Accordingly, the angle of the reflecting mirror 132 can be adjusted without removing the cover of the upper portion of the housing 31 of the exposure device.

The exposure device 13 of this embodiment has a structure in which the rotary shaft of the eccentric cam is fixed in a direction vertical to the bottom surface 31A of the housing 31, and the reflecting mirror is supported by being held between the leaf spring and the eccentric cam. Accordingly, even if vertical vibration or the like is applied to the exposure device 13, the position of the mirror adjusted by the eccentric cam is less likely to deviate.

In the above embodiment, the eccentric cams 136 and 137 are arranged on the reflection surface side of the reflecting mirror 132, and the leaf spring 135 is arranged on the surface side facing the reflection surface; however, this arrangement relationship is not limited. For example, the arrangement relationship between the eccentric cams 136 and 137, and the leaf spring 135 may be reversed. Namely, the reflecting mirror 132 is supported at three points by interposing the both ends of the reflecting mirror 132 in between the eccentric cams 136 and 137 and the leaf spring 135, and the mirror angle may be adjusted by changing spatial positions of two of the three mirror support points. Accordingly, the arrangement relationship between the eccentric cams 136 and 137, and the leaf spring 135 can be reversed. The leaf spring 135 may be an elastic member other than a plate-shaped spring.

In the above embodiment, although the first and second adjustment gears 136c and 137c are provided respectively in the eccentric cams 136 and 137, the invention is not limited to this constitution. For example, the first and second adjustment gears 136c and 137c may not be provided in the eccentric cams 136 and 137. When the eccentric cams 136 and 137 do not have the first and second adjustment gears 136c and 137c, the eccentric cams 136 and 137 are freely rotatable compared with the case in which the eccentric cams 136 and 137 have a gear structure. Accordingly, a worker for adjustment can adjust the rotation angles of the eccentric cams 136 and 137 at any position. The stopper 138 may have any shape as long as the eccentric cams 136 and 137 can be reliably fixed at the adjustment position.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:
1. An exposure device comprising:
   a mirror which reflects light emitted from a light source in a housing toward an object to be exposed;
   first and second elastic members positioned at first and second ends opposite each other in a longitudinal direction of the mirror and pressing against one of a reflection surface of the mirror and a surface opposite the reflection surface;
   a first eccentric cam positioned opposite to the first elastic member across the mirror and rotatable around a first rotary shaft, the first eccentric cam having an eccentric shape including a first outer peripheral portion which abuts against a first mirror support point on the first end in the longitudinal direction of the mirror, the eccentric shape causing a distance between the first rotary shaft and the first mirror support point to vary when the first eccentric cam is rotated around the first rotary shaft; and a second eccentric cam positioned opposite to the second elastic member across the mirror and rotatable around a second rotary shaft, the second eccentric cam having an eccentric shape including a second outer peripheral portion which abuts against a second mirror support point on the second end, the eccentric shape causing a distance between the second rotary shaft and the second mirror support point to vary when the second eccentric cam is rotated around the second rotary shaft, wherein the first and second rotary shafts of the first and second eccentric cams are fixed perpendicular to a bottom surface of the housing, the first and second eccentric cams have first and second adjustment gears provided around the first and second rotary shafts, respectively, the first and second adjustment gears configured to vary the distances between the first and second rotary shafts and the first and second mirror support points in a stepwise manner as the first and second eccentric cams are respectively rotated, and the first and second eccentric cams have respective recesses for adjustment formed on bottom surfaces of the first and second rotary shafts.

2. The exposure device according to claim 1, wherein the elastic members press against the surface opposite the reflection surface of the mirror.

3. The exposure device according to claim 1, further comprising a stopper which fixes the first and second adjustment gears at desired adjustment positions.

4. The exposure device according to claim 3, wherein the stopper has a claw formed to mate with the first and second adjustment gears.

5. The exposure device according to claim 3, wherein the stopper has a drop prevention mechanism which rotatably fixes the first and second eccentric cams within the housing.

6. The exposure device according to claim 1, wherein, for each recess, the housing includes an eccentric cam adjustment hole formed in the bottom surface of the housing to provide access to the recess.

7. An image forming apparatus comprising:
an exposure device which applies light to an image carrier to expose the image carrier and thereby form an electrostatic latent image on the image carrier;
a developer which develops the electrostatic latent image formed on the image carrier into a toner image on the image carrier;
a transfer charger which transfers the toner image from the image carrier to a recording medium; and
a fixing device which fixes the transferred toner image to the recording medium,
wherein the exposure device includes:
  a mirror which reflects light emitted from a light source in a housing toward the image carrier,
  first and second elastic members positioned at first and second ends opposite each other in a longitudinal direction of the mirror and pressing against one of a reflection surface of the mirror and a surface opposite the reflection surface,
  a first eccentric cam positioned opposite to the first elastic member across the mirror and rotatable around a first rotary shaft, the first eccentric cam having an eccentric shape including a first outer peripheral portion which abuts against a first mirror support point on the first end in the longitudinal direction of the mirror, the eccentric shape causing a distance between the first rotary shaft and the first mirror support point to vary as the first eccentric cam is rotated around the first rotary shaft, and
  a second eccentric cam positioned opposite to the second elastic member across the mirror and rotatable around a second rotary shaft, the second eccentric cam having an eccentric shape including a second outer peripheral portion which abuts against a second mirror support point on the second end, the eccentric shape causing a distance between the second rotary shaft and the second mirror support point to vary as the second eccentric cam is rotated around the second rotary shaft, wherein the first and second rotary shafts of the first and second eccentric cams are fixed perpendicular to a bottom surface of the housing, the first and second eccentric cams have first and second adjustment gears provided around the first and second rotary shafts, respectively, the first and second adjustment gears configured to vary the distances between the first and second rotary shafts and the first and second mirror support points in a stepwise manner as the first and second eccentric cams are respectively rotated, and the first and second eccentric cams have respective recesses for adjustment formed on bottom surfaces of the first and second rotary shafts.

8. An exposure device comprising:
a mirror which reflects light emitted from a light source in a housing toward an object to be exposed;
first and second elastic members positioned at first and second ends opposite each other in a longitudinal direction of the mirror and pressing against one of a reflection surface of the mirror and a surface opposite the reflection surface;
a first eccentric cam positioned opposite to the first elastic member across the mirror and rotatable around a first rotary shaft, the first eccentric cam having an eccentric shape including a first outer peripheral portion which abuts against a first mirror support point on the first end in the longitudinal direction of the mirror, the eccentric shape causing a distance between the first rotary shaft and the first mirror support point to vary as the first eccentric cam is rotated around the first rotary shaft; and
a second eccentric cam positioned opposite to the second elastic member across the mirror and rotatable around a second rotary shaft, the second eccentric cam having an eccentric shape including a second outer peripheral portion which abuts against a second mirror support point on the second end, the eccentric shape causing a distance between the second rotary shaft and the second mirror support point to vary as the second eccentric cam is rotated around the second rotary shaft, wherein
the first and second eccentric cams have respective recesses for adjustment formed on bottom surfaces of the first and second rotary shafts.

* * * * *